1,820,410

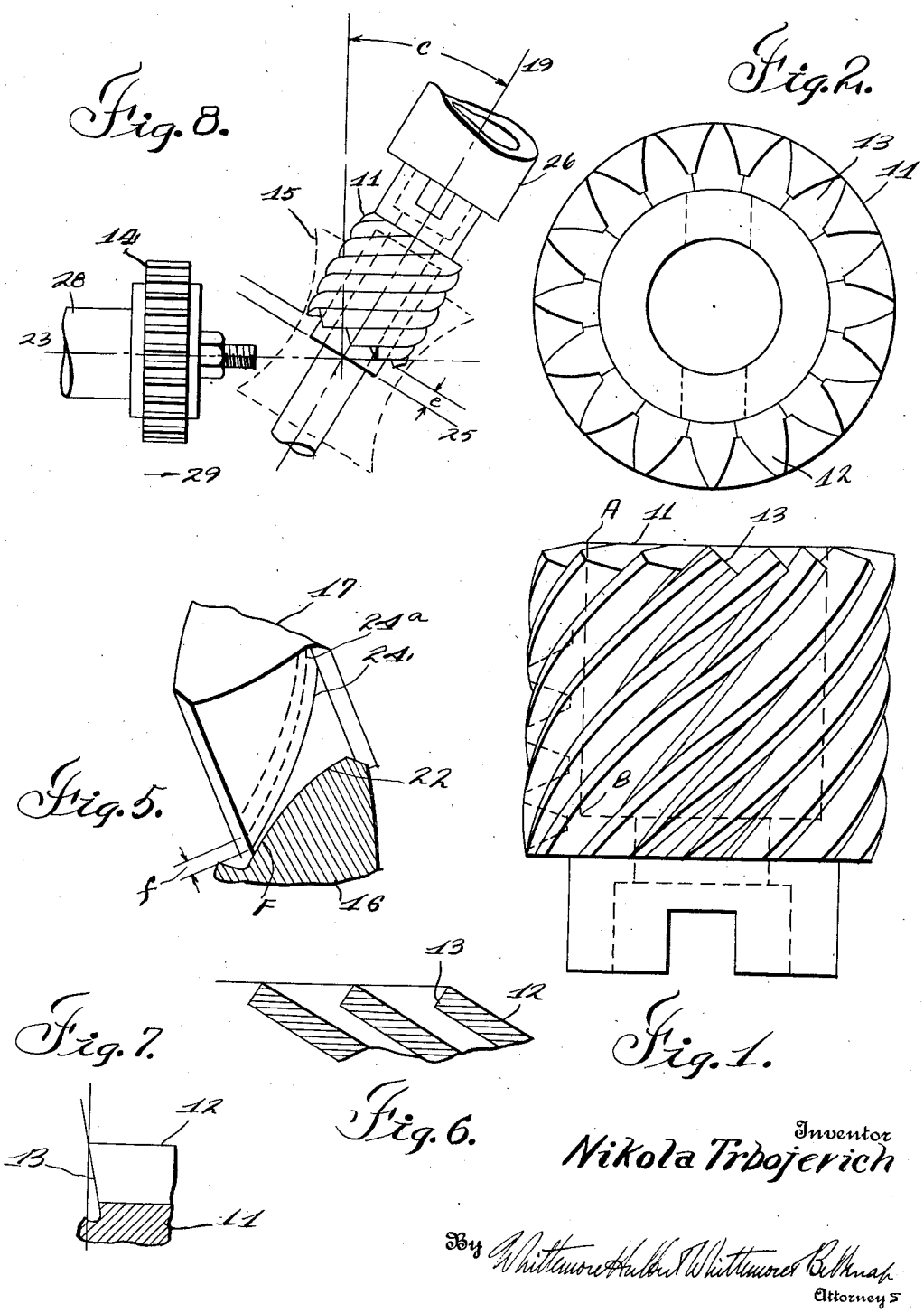

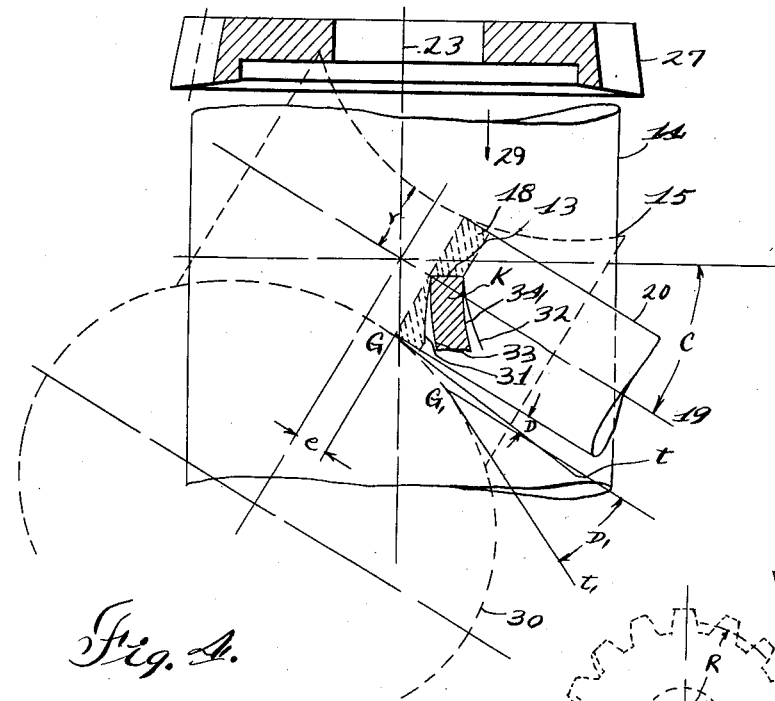
Fig. 4.
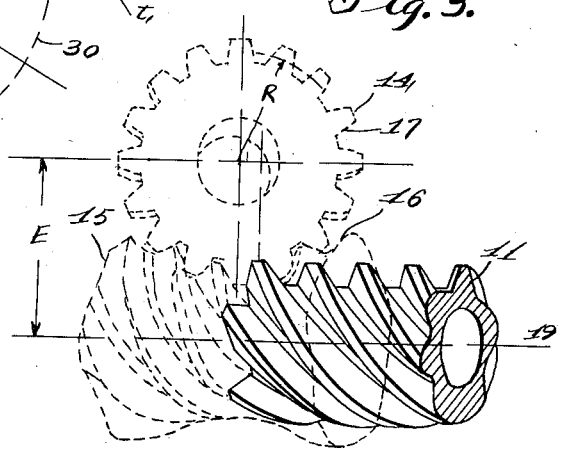
Fig. 3.
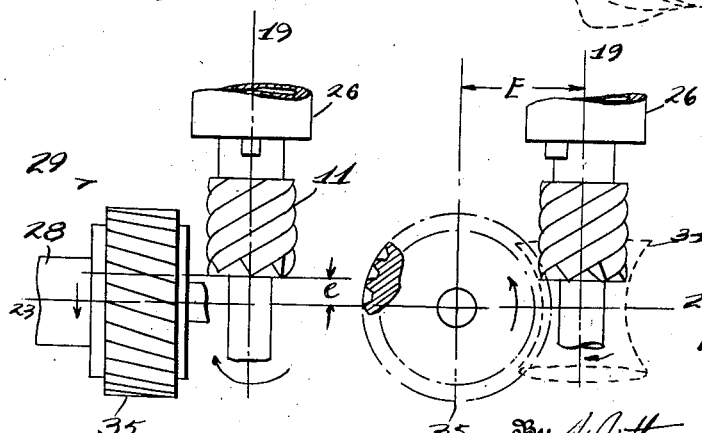
Fig. 9.
Fig. 10.
Inventor
Nikola Trbojevich
By Whittemore Hulbert Whittemore Belknap
Attorneys Patented Aug. 25, 1931

UNITED STATES PATENT OFFICE

NIKOLA TRBOJEVICH, OF HIGHLAND PARK, MICHIGAN

GEAR HOB AND METHOD OF MAKING AND USING THE SAME

Application filed August 6, 1928. Serial No. 297,766.

The invention relates to a novel gear hob of the solid worm, clearanceless type.

The object of this invention is to produce a hob of the type described in my co-pending application, Serial No. 161,162, filed on January 14, 1927 in which the tooth forms may be mechanically generated in a suitable form to produce spur and helical gears of a predetermined degree of accuracy. Another object is to provide a method for manufacturing a hob of the above type for spur or helical gears.

Another object is to provide a method according to which the new hobs may be used for the indicated purpose, i. e. for cutting of spur and helical gears, in a common hobbing machine without any structural changes in the said machine. A further object is to provide a method of generating the corrected hob tooth curves in a hobbing machine similar to that in which the completed hob is to be used.

In the drawings

Figure 1 is the elevation of the new hob;

Figure 2 is the plan view thereof;

Figure 3 shows in a perspective view the generation of the auxiliary hour glass worm from which the corrected tooth curves are to be obtained;

Figure 4 is a diagram explanatory of the geometry of the auxiliary worm;

Figure 5 is a diagram explanatory of the kinematical principle involved;

Figures 6 and 7 are diagrams showing the location of the cutting facets relative to the bodies of hob teeth;

Figure 8 is a detail plan view of a common hobbing machine showing the method of generating the auxiliary worm and that of generating spur gears;

Figures 9 and 10 diagrammatically show in plan and elevation respectively the method adapted to cutting helical gears.

The new hob 11, Figures 1 and 2, consists of a cylindrical steel shell having on its outer circumference a plurality of similar uninterrupted helical cutting teeth or threads 12, said threads all being topped off by means of a plurality of cutting facets 13, one facet for each thread and all facets arranged in a circle about the hob axis. This construction constitutes a simple, strong and durable cutting tool in that it may be resharpened any number of times until the metal from A to B is fully consumed in useful cutting. At the same time, during all such resharpenings the cutting profile, the angle, the thickness of teeth, the cutting efficiency, the required distance from the work and the diameter of the hob will all remain strictly unchanged providing care is taken in resharpening to maintain the angular relation of the facets relative to the cutter axis.

In order to determine the contour of the cutting teeth or threads of the hob which will be proper for producing spur gear teeth, it is necessary to study the theory underlying my invention. For this purpose let us suppose that in some manner we have developed an hour glass worm 15 (Figure 3) that will mesh with the gear 14 to be cut at a predetermined center distance E, shaft angle C, ratio, hand of helix, etc. Suppose further that for a limited length the teeth 16 of the said worm 15 engage the teeth 17 of the gear 14 with a line contact at every instant. As it will be hereinafter shown, it is entirely practicable to produce such worms. Let us now select an offset circular band 18, Figure 4 in the said worm from which to form the proposed hob teeth. The worm 15 touches the mating gear 14 at every instant along a curve lying in the zone 18, the aggregate of all these curves being the thread surface of the worm in the zone 18.

A prime condition in forming the cutting edges of the new hob is that said edges should lie in their entirety in the above mentioned worm thread surface. A second condition is that the selected cutting edges shall possess a natural cutting clearance relative to gear teeth in all cutting positions when the said tooth curves are backed up by metal in the form of a cylindrical screw or hob 11, Figure 3.

In order to form the cutting edges we intersect the teeth 16 of the worm 15 transversely in the zone 18 by means of a plurality of plane facets 13, Figure 4. It is desirable that these facets should be planes, for the ease in manufacture, and also at right angles to the thread and hooked as indicated in Figures 6 and 7 to increase the efficiency of the cutting action. It is significant that there is no theoretical restriction as to the particular form or angle of these cutting facets which fact renders this method adaptable to a variety of objects and circumstances met with in practice.

Suppose now that in the manner indicated the cutting edge 22, Figure 5 was obtained. Said edge 22 lies entirely in the generated worm thread surface and therefore must touch the finished tooth surface of the spur gear tooth 17 in at least one point such as F, at any instant. Upon rotating the curve 22 about the worm axis 19 and the spur tooth 17 about the gear axis 23 in a timed relation, the curve 22 will reproduce itself by a combination of a rolling and sliding motion into the curve 24, said latter curve lying entirely in the tooth surface of the tooth 17. By continuing the above mentioned rotation about the respective axes 19 and 23 and assuming that a plurality of equispaced curves 22 is distributed about the circumference of the hob or worm, upon each spur tooth 17 a curve similar to 24 will be traced along which curves the tooth surfaces will be completely finished. If we now apply a feed movement a distance F, Figure 5, for each revolution of the blank 14, along the axis 23, a curve 24a similar and parallel to the curve 24 will be generated. It is thus seen that in such a manner a complete spur gear may be generated providing the curves 24 all extend from the top to the root of the spur tooth 17. It is also seen that the only machine motions which are required for the complete generation of the blank 14 are a timed rotation of the blank and hob and a feed motion along the axis 23. From this it follows that the cutting operation may be performed in a common hobbing machine.

The design and manufacture of the master worm will now be described. It is seen from Figures 3 and 4 that the master worm is an hour glass of an elliptic meridian. Its pitch radius $r$, Figure 4, in the throat plane 25 may be calculated from the formula $$r = \frac{n}{2P} \sin C \quad (1)$$

Where $C$ is the shaft angle (to which the hob arbor will be set in the hobbing machine), $n$ is the number of teeth in the worm and hob, and $P$ is the diametrical pitch of the spur gear 14 to be cut.

The pitch radius $R$ of the gear 14, Figure 3, is found from the well known formula $$R = \frac{N}{2P} \quad (2)$$

where $N$ denotes the number of teeth in the gear. Hence, the center distance $E$ $$E = r + R \quad (3)$$

Regarding the shaft angle $C$, it was suggested in the above mentioned application for patent that the angle should be 45 degrees. However, after performing some further experiments I am now inclined to believe that 30 degrees is more suitable for this work. Thus by taking $C$ equal to 30 degrees, its sine will be equal to exactly one-half, and the center distance $E$ then becomes $$E = \frac{1}{2P}(N + 2n) \quad (4)$$

which gives a simple and easily remembered formula for the use in shop.

The generation of the hour glass worm with the above information at hand may now be readily performed in a common hobbing machine. The blank is mounted upon the hob arbor 26, Figure 8, is centered with respect to the gorge plane 25, and is set to the required center distance $E$. The hob arbor 26 is tipped to the angle $C$, and the change gears are selected to produce the required ratio $$\frac{N}{n}.$$

In the place of the blank 14, Figure 8, we now place upon the work arbor 28 a Fellows cutter 27, Figure 4, which cutter is an exact duplicate of the gear to be cut as to its pitch diameter, number of teeth, form of tooth curves, etc. The machine is then started and the Fellows cutter 27 is slowly fed across the blank 15 until all metal in the path of the cutter is removed. It will be noted that a blank 15 also could be finished without the use of a Fellows cutter if it were made of some plastic material such as lead and run together with the gear 14 although the result would not be quite as accurate as in the former case. It will also be seen that the Fellows cutter 27 may be replaced by a single fly tool or a worm hob.

The manufacture of the new hob will now be described. The zone 18, Figure 4, in which the cutting edges of the hob lie is offset from the central or gorge plane 25 at a distance $e$, said distance roughly determining the amount of cutting clearance D which the hob will have. Thus if we draw a tangent $t$ to the ellipse 30 at its point G, the cutting clearance will be expressed by the angle D. However, if we move the point G to G', i. e. farther from the gorge plane 25, the slope of the new tangent t, the clearance will be increased to the angle D'. It is thus seen that the farther the zone 18 is removed from the plane 25, the more cutting clearance the new hob will possess, other things being equal.

After forming the cutting facet 13, Figure 4, we may imagine the globoid thread as being intersected by the actual pitch cylinder 20 of the proposed hob, said cylinder being, of course, concentric with the axis 19. The lines of intersection will be the two divergent curves 31 and 32 shown at about the center of the Figure 4. Now we draw two parallel helixes 33 and 34 so selecting the lead of the said helixes that the cross sectioned area K will fall inside the curves 31 and 32 and preferably in such a manner that the area K will lie at about the same distance from each of the said curves 31 and 32.

From this the theory of cutting clearances will readily be understood. The globoid thread of the hour glass worm 15 and the helical thread of the hob 11 both intersect each other in the cutting facet 13. Going now outwardly from the said facet the globoid thread is diverging from the axis of rotation 19 whereas the hob thread remains equidistant from the said axis. Thus, the hob thread once correctly started will never again intersect the globoid thread and will, therefore, never touch the spur gear 14 again, which fact in itself constitutes cutting clearance.

The method of manufacturing the new hobs may now be summarized in the case of spur gears. The first step is to construct a master worm for the purpose of obtaining the data as to the curvature of the teeth in order that the curvature of the hob may be copied therefrom. As heretofore brought out, it is necessary to so select the curvature of the hob teeth that cutting clearance is provided, although the teeth are of uniform cross section throughout. The worm 15 is constructed in the manner previously described to be capable of meshing with gear 14 in a line contact. An offset zone 18 is then selected in the said worm, the amount of offset being governed by the amount of cutting clearance required. The facets 13 are then formed in the said zone, said facets being usually planes transverse to the threads and radially hooked. The cutting edges 22, Figure 5, so obtained are copied upon a form tool and the threads of the hob 11 are chased therewith. The lead of the hob thread is not strictly determined and may vary through a certain range, the lead furnishing the best cutting action being usually determined experimentally.

The method of setting up the hob 11 in a common hobbing machine is illustrated in Figure 8. The hob angle C and the center distance E are the same as previously described in the case of the hour glass worm. The distance e from the gorge plane 25 is preferably stamped upon the hob and the hob must be offset to this exact distance. When the hob is resharpened, it must be re-set in the hobbing machine, as the distance e must be kept constant during the life of the hob.

The method of hobbing helical gears is illustrated in Figures 9 and 10. The hob 11 in this case is developed from the hour glass worm 34, said worm meshing with the helical gear 35 to be cut. In selecting the timing gears the effect of the feed motion along the arrow 29 must now be taken into consideration on account of the helical nature of the work. The shaft angle between the axes 23 and 19 is shown in Figures 9 and 10 to be 90 degrees which is a specific case but said angle ordinarily may be more or less than 90 degrees.

What I claim as my invention is:

1. A method of constructing hobs of the solid worm unrelieved type consisting in generating an hour glass worm capable of meshing with the gear to be cut with a line contact, in selecting an offset zone in the said worm with a view upon the ultimate cutting clearance, in intersecting the threads of the said worm in the said zone by means of a plurality of transverse facets, in continuing the curves of intersection so obtained along the axis of the worm to form a helicoid of constant pitch and cross section, said helicoid always lying inside of the said hour glass surface, and in copying the hob from the said straight helicoid to conform with the same both as to its contour and the relative location of its cutting facets.

2. A method of forming the cutting edges in hobs of the solid worm unrelieved type consisting in generating a tapering screw surface meshing with the gear to be cut in a line contact, in selecting an offset zone in the said screw having a sufficient slope to provide the ultimate cutting clearance, in selecting a series of curves of intersection in the said screw surface in the said zone, in copying the said curves to form the cutting edges of the hob and in supporting the said cutting edges by means of a cylindrical screw of a constant pitch and cross section, the latter screw being co-axial with the tapering screw and extending in the diverging portion thereof.

3. A gear hob consisting of a cylindrical worm body having helical threads of a constant lead and cross section throughout and a frontal zone in the said body containing a plurality of cutting facets and cutting edges, said edges being the lines of intersection with a co-axial tapering worm formed in a zone offset relative to a plane perpendicular to the pitch cylinder of the gear when the latter worm is formed to mesh with the gear to be generated in a line contact.

4. A hob for generating spur gears consisting of a cylindrical worm body having helical threads of a constant lead and cross section throughout and a frontal zone in the said body containing a plurality of cutting facets and cutting edges, said edges being the lines of intersection of the said worm with a coaxial longitudinally elliptic hour glass screw surface in a zone offset relative to a plane perpendicular to the pitch cylinder of the gear, said surface being capable of engaging the gear to be generated in a line contact in the said offset zone.

5. The method of generating corrected tooth curves in a hob of the solid worm clearanceless type for cutting gears which consists in placing a duplicate of the tooth to be cut upon the work arbor and a tapering blank upon the hob arbor of a hobbing machine, in selecting the timing gears to produce the predetermined ratio of rotation, in angularly adjusting the hob arbor in its plane relative to the work arbor, in adjusting the center distance, in feeding the hob arbor relative to the work arbor in a direction parallel to the latter and so generating curved teeth in an offset portion of the said tapered blank with a view upon ultimate cutting clearance, in intersecting the said curved teeth by means of transversely disposed facets in the said offset portion and in copying the curves of intersection so formed upon the hob to be made.

6. A gear hob consisting of a cylindrical body and a plurality of helical cutting threads of the same cross section throughout their lengths in which the cutting faces are disposed at the front end of the hob in a circle and are formed conjugate to the tooth curves of the gear to be generated in a plane inclined at an angle corresponding to the ultimate cutting clearance relative to a normal of the pitch cylinder of the gear drawn at the point of tangency and in which the helical lead of the hob threads is determined with a view of diverging from the adjacent gear tooth flanks substantially the same amount at both sides of the threads thereby containing a cutting action free from rubbing.

7. A gear hob of the solid worm helical type having cutting edges disposed at its front end in a circle in which the cutting edges are copied from an offset zone of a globoid worm capable of meshing with the gear to be cut and the helical lead of the threads is determined with a view of diverging from the adjacent gear tooth flanks substantially the same amount at both sides of the threads thereby obtaining a cutting action free from rubbing.

In testimony whereof I affix my signature.

NIKOLA TRBOJEVICH.